various metal halides, such as aluminum chloride, to accelerate this reaction; however, the metal halides which act as catalysts in a ketone synthesis of this type are hygroscopic, easily hydrolyzed, and difficult to store and handle.

United States Patent Office 2,802,032
Patented Aug. 6, 1957

2,802,032

3,4-DIMETHYLBENZOPHENONE

Erhard J. Prill, Dayton, Ohio, assignor to Monsanto Chemical Company, St. Louis, Mo., a corporation of Delaware No Drawing. Application June 22, 1955,
Serial No. 517,357

3 Claims. (Cl. 260—591)

This invention relates to the preparation of 3,4-dimethylbenzophenone.

In accordance with the present process, benzoyl chloride is contacted with o-xylene in the presence of a catalytic amount of zinc oxide.

The condensation of acyl halides with hydrocarbons to give ketones, with evolution of HCl, proceeds only with difficulty and to a negligible extent in the absence of a catalyst. It has been known hitherto to use various metal halides, such as aluminum chloride, to accelerate this reaction; however, the metal halides which act as catalysts in a ketone synthesis of this type are hygroscopic, easily hydrolyzed, and difficult to store and handle.

The process of the present invention is based on the discovery that the acylation of aromatic ketones can be catalyzed by stable, non-halogen-containing, oxy compounds of zinc.

It has been found that oxy compounds of zinc, such as zinc benzoate, zinc carbonate, zinc hydroxide and zinc oxide, are useful catalysts for the acylation of aromatic compounds. Particularly preferred for use as an acylation catalyst in the present process is zinc oxide. Zinc oxide can be obtained as a free-flowing, non-agglomerating powder which is inexpensive and readily available. Unlike the metal halides, the present catalyst is insensitive to moisture and its use does not require the rigorously anhydrous conditions previously necessary in acylation reactions. It is safe and convenient to handle, and it has been found that very low amounts of the oxide suffice to produce rapid acylation.

I have discovered that low yields are obtained when it is attempted to condense benzoyl chloride in the presence of zinc oxide with a dialkyl aromatic compound in which the alkyl groups contain more than three carbon atoms. For example, heating benzoyl chloride with di-p-t-butylbenzene in the presence of zinc oxide for ten hours at above 200° C. gave little or no reaction. On the other hand, condensation of benzoyl chloride with o-xylene in the presence of zinc oxide gave an excellent yield of ketone in less than three and a half hours.

In operating the present invention, I simply contact the benzoyl chloride with the o-xylene in the presence of catalytic amounts of zinc oxide at temperatures at which the evolution of hydrogen chloride occurs, i. e., from 100 to 200° C., preferably 150–175° C., until reaction is complete. The hydrogen chloride evolved in the condensation of the acyl halide with the hydrocarbon is removed during the reaction; for example, the hydrogen halide gas may be taken off from the reaction vessel and vented to the atmosphere, absorbed in a caustic wash, etc. Cessation of evolution of hydrogen chloride signals the completion of reaction, after which the unreacted material may be removed if desired, as by washing, distilling, etc., and the product isolated. Solvents are generally unnecessary, but may be employed, if desired. The temperatures of the reaction are governed by ambient pressure conditions, which may be varied from ordinary atmospheric pressure to attain super- or sub-atmospheric pressure conditions, without interfering with the present reaction. Generally, the higher the temperature, the faster the reaction. The method may be operated as a continuous process, or by a batch run technique. If, as for example in batch operation, minimum residues are preferred, equimolar amounts of the benzoyl chloride and the o-xylene may be reacted; conveniently, however, an excess of the aromatic hydrocarbon is used, the excess serving as solvent and diluent for the reaction. The zinc oxide need be present in only catalytic amounts, i. e., from 0.1 percent or less, to 5 percent or more by weight of total reactants. The reaction product is substantially homogeneous 3,4-dimethylbenzophenone, which may be readily isolated by fractional distillation, for example. If desired, the ketone may be purified by a caustic wash, extraction, etc. 3,4-Dimethylbenzophenone is a stable compound which is highly useful, e. g., as a herbicide.

The invention is further illustrated, though not limited, by the following example of procedure:

A mixture consisting of 140.5 grams (1 mole) of benzoyl chloride, 212 grams (2 moles) of 90 percent o-xylene, and 2 grams of zinc oxide was refluxed, while hydrogen chloride was evolved and removed, for 3⅓ hours. By fractional distillation, the product 3,4-dimethylbenzophenone was isolated as the fraction boiling between 148° C./2 mm. and 138° C./1 mm., which had an $n_D^{25}$ of 1.5967. The ketone obtained weighed 185 grams, which is an 88 percent yield. Recovered xylene weighed 113 grams.

What is claimed is:

1. The process which comprises reacting benzoyl chloride with o-xylene in the presence of zinc oxide at a temperature at which hydrogen chloride is evolved therefrom, and isolating from the resulting reaction product 3,4-dimethylbenzophenone.

2. The process which comprises reacting benzoyl chloride with o-xylene in the presence of zinc oxide at a temperature of from 100° to 200° C., and isolating from the resulting reaction product 3,4-dimethylbenzophenone.

3. The process which comprises reacting benzoyl chloride with o-xylene in the presence of zinc oxide at a temperature of from 150° to 175° C. and isolating from the resulting reaction product 3,4-dimethylbenzophenone.

References Cited in the file of this patent

UNITED STATES PATENTS 2,386,007    Schmerling et al. _____ Oct. 2, 1945

OTHER REFERENCES

Grucarevic et al.: Ber. deut. Chem., 6, 1238–1246 (1873).